US006382168B1

(12) United States Patent
Sayama et al.

(10) Patent No.: US 6,382,168 B1
(45) Date of Patent: May 7, 2002

(54) COMPONENT FITTING STRUCTURE

(75) Inventors: Takehiko Sayama; Nobuharu Takahashi, both of Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/584,382

(22) Filed: May 31, 2000

(30) Foreign Application Priority Data

May 31, 1999 (JP) .......................................... 11-150966

(51) Int. Cl.[7] ................................................ F16H 7/08
(52) U.S. Cl. ................................................ 123/195 C
(58) Field of Search .......................... 123/90.27, 90.31, 123/195 C; 74/606 R; 474/110, 109, 111

(56) References Cited

U.S. PATENT DOCUMENTS 2,730,088 A * 1/1956 Hyde ..................... 123/190.2
5,193,498 A * 3/1993 Futami .................... 123/90.31
5,410,996 A * 5/1995 Baird .................... 123/80 BA
6,120,403 A * 9/2000 Suzuki et al. ............... 474/111

FOREIGN PATENT DOCUMENTS

JP 8151955 A * 6/1996

* cited by examiner

*Primary Examiner*—Marguerite McMahon
*Assistant Examiner*—Hyder Ali
(74) *Attorney, Agent, or Firm*—Sughrue Mion, PLLC

(57) ABSTRACT

A component fitting structure includes a component fitting hole (25) formed across mated faces between a cylinder head (4) and chain cover (24), and a collar (26) fitted in the component fitting hole through a liquid gasket, a tensioner unit 21*a* being engaged with the collar. Because the component fitting portion extends across the mated faces the members themselves can be made smaller in size. Further, since the collar can be attached in advance to one of these members before they are mated together, the fitting portion of the component can be easily observed visually. Further, the component can be removed without separating the two members from each other.

19 Claims, 6 Drawing Sheets

COMPONENT FITTING STRUCTURE

BACKGROUND OF THE INVENTION

1. Field of the Invention

The present invention relates to a component fitting structure, and more particularly to a structure for fitting the component such as a tensioner unit for automatically adjusting tension of a chain which is wound around a crank sprocket and a cam sprocket to an end of an engine at a side of a crank pulley.

2. Description of the Related Art

As the structures of the type, there have been known such a structure that the tensioner unit is fitted to an end face of a cylinder block or a cylinder head that is a first member at a side of the chain, and then, an end face of the engine in a direction of a crankshaft including a fitting portion of the tensioner unit is covered with a chain cover that is a second member, Such a structure also have been known that the fitting portion of the tensioner unit is provided on an extended portion of a side wall of the cylinder block or the cylinder head and covered with a removable cover.

The former of the above described conventional structures has a drawback that it is likely to deteriorate in assembly, conservaton and maintenance, since the chain cover grows larger in order to cover the tensioner unit and further the entire chain cover must be removed to get access to the tensioner unit. The latter structure has also a drawback that the face of the cylinder block or the cylinder head to be mated with the chain cover expands in a direction of the crankshaft, and accordingly, upsizing of the engine is inevitable.

SUMMARY OF THE INVENTION

The invention has been made in order to solve the above described problems of the conventional art. It is an object of the invention to provide a component fitting structure in which the chain cover or a belt cover and the cylinder block or the cylinder head can be minimized without deteriorating in assembling workability and maintainability.

In order to attain such an object, there is provided according to the invention, a component fitting structure which comprises a component fitting hole (25) formed across mated a mated faces between a first member (e.g. a cylinder head 4 in an embodiment or a cylinder block) and a second member (e.g. a chain cover 24 in the embodiment or a belt cover) and a collar (26) fitted in the component fitting hole through a liquid gasket, the component to be fitted (e.g. a tensioner unit 21*a* in the embodiment) being engaged with the collar.

According to the invention, because the component fitting portion can be provided across the mated faces between the first member and the second member, the members themselves can be made smaller in size as compared with the case where the component is fitted to either one of the members. Moreover, because the collar can be attached in advance to one of these members before the first and the second members are mated together, the fitting portion of the component can be easily observed visually. Further, the component can be removed without separating the two members from each other.

According to a second aspect of the invention, the component fitting hole comprises a semicircular recess formed in the first member and a semicircular recess formed in the second member.

According to a third aspect of the invention, the component to be fitted is engaged with an inner peripheral face of the collar through an O-ring.

According to a fourth aspect of the invention, the collar is provided with a locating pin at a position on an outer peripheral face thereof, the locating pin being fitted in a corresponding hole formed in a bottom face of the recess of the fitting hole.

According to a fifth aspect of the invention, the locating pin is integrally formed with the collar.

According to a sixth aspect of the invention, the mated faces are displaced from a plane passing a center of the component to toward either of the first member and the second member.

According to a seventh aspect of the invention, the mated faces are in alignment with the center of the component to be fitted.

According to an eighth aspect of the invention, there is provided a component fitting structure which comprises a component fitting hole formed across mated contact between a first member and a second member, and a collar fitted in the component fitting hole through a liquid gasket, the component to be fitted being engaged with the collar, the component fitting hole comprising a semicircular recess formed in the first member and a semicircular recess formed in the second member, and the component to be fitted being engaged with an inner peripheral face of the collar through an O-ring.

According to a ninth aspect of the invention, there is provided a component fitting structure which comprises a component fitting hole formed in a cylinder head or a cylinder block as a first member and a chain cover or a belt cover as a second member across mated mated faces therebetween, and a collar fitted in the component fitting hole through a liquid gasket, a tensioner unit as the component to be fitted being engaged with the collar.

According to a tenth aspect of the invention, the component fitting hole comprises a semicircular recess formed in the cylinder head or the cylinder block and a semicircular recess formed in the chain cover or the belt cover.

According to an eleventh aspect of the invention, the tensioner unit is engaged with an inner peripheral face of the collar through an O-ring.

According to a twelfth aspect of the invention, the collar is provided with allocating pin at a position on an outer peripheral face thereof, the locating pin being fitted in a corresponding hole formed in a bottom face of the recess of the fitting hole.

According to a thirteenth aspect of the invention, the locating pin is integrally formed with the collar.

According to a fourteenth aspect of the invention, the mated faces are in alignment with a center of the tensioner unit.

According to a fifteenth aspect of the invention, the mated faces are slightly displaced from a plane passing the center of the tensioner unit toward the cylinder head or the cylinder block.

According to a sixteenth aspect of the invention, the component fitting hole comprises a semicircular recess formed in the cylinder head or the cylinder block and a semicircular recess formed in the chain cover or the belt cover, and an inner peripheral face of the semicircular recess in the chain cover or the belt cover is tangentially extended from a straight line which is parallel to the mated faces.

According to a seventeenth aspect of the invention, fitting bolts of the tensioner unit are fastened at two points in the cylinder head or the cylinder block.

According to an eighteenth aspect of the invention, the cylinder head or the cylinder block is provided with bolting holes along a straight line which is perpendicular to the mated faces and passes the center of the tensioner unit.

According to a nineteenth aspect of the invention, the chain cover is provided with an access hole in order to remove a lock pin for locking an operation of a plunger of the tensioner unit, and a boss including the access hole and a boss around the fitting hole are connected by a rib.

According to a twentieth aspect of the invention, the tensioner unit is fitted to an exterior of a bank of a V-type engine and a single bolting hole is provided in the cylinder head or the cylinder block.

DETAILED DESCRIPTION OF THE PREFERRED EMBODIMENTS

Now, preferred embodiments according to the invention will be described in detail by way of examples referring to the attached drawings.

Figure 1:
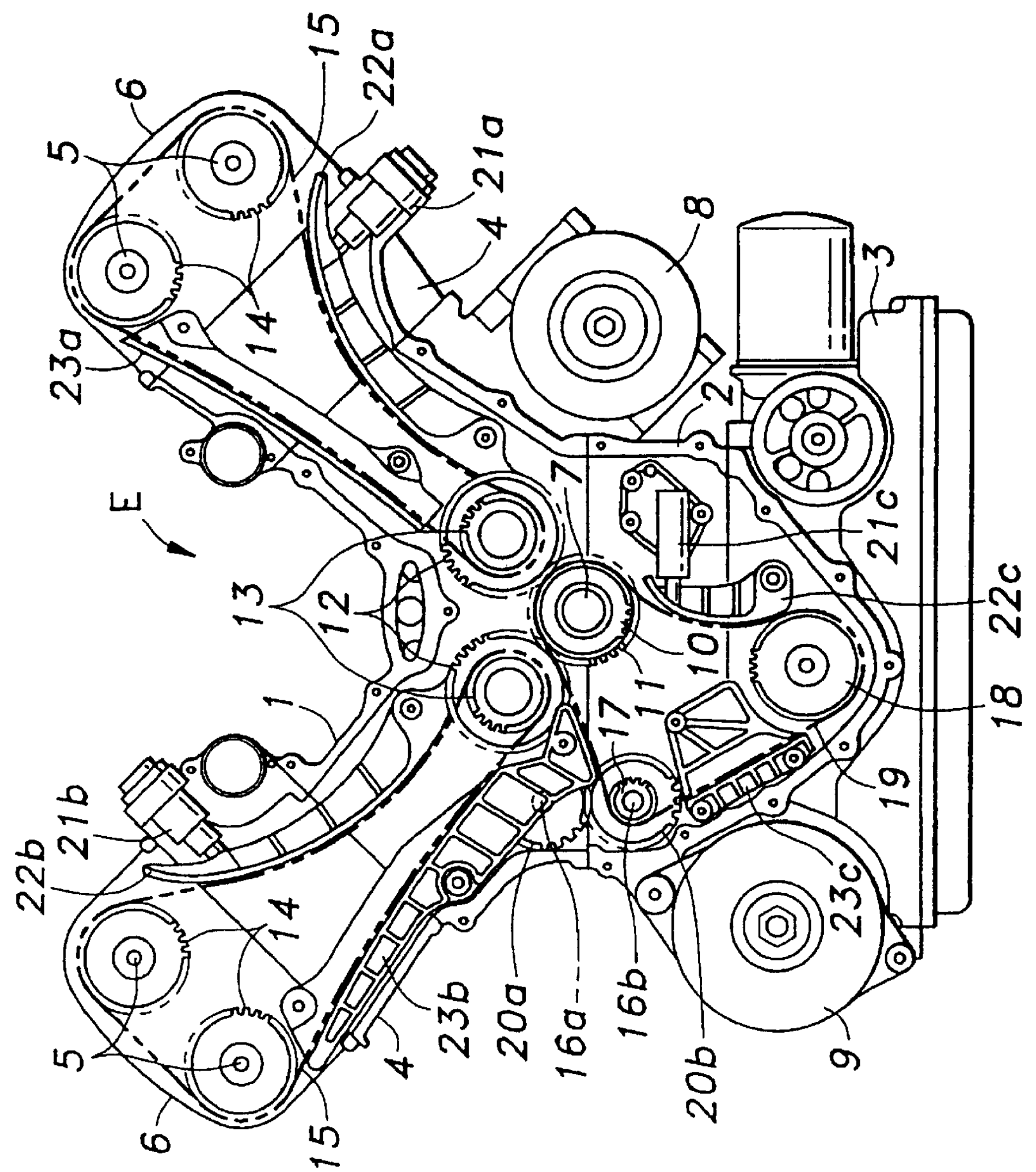
FIG. 1 is an elevational view of a V-type engine at a side of a crank pulley to which the present invention is applied.

FIG. 1 is an elevational view of a four cycle V-type eight cylinder engine at a side of a crank pulley to which the present invention is applied.

The engine E comprises an upper block 1 having a pair of cylinder banks, a lower block 2 mated to a lower face of the upper block 1, an oil pan 3 attached to a lower face of the lower block 2, and cylinder heads 4 respectively attached to upper faces of the two cylinder banks of the upper block 1. The two cylinder banks provide a bank angle of 90 degree between them. Above each of the cylinder heads 4 is provided two camshafts 5. These camshafts 5 are covered with respective head covers 6 which are attached to upper faces of the cylinder heads 4.

A crankshaft 7 is supported by a main bearing on mated faces between the upper block 1 and the lower block 2 in the same manner as in the conventional engine.

A compressor 8 of an air conditioner is mounted on the upper block 1 at right hand of the crankshaft 7 in FIG. 1, and an alternator 9 is mounted on the lower block 2 at left hand of the crankshaft 7 in FIG. 1. These compressor 8 and the alternator 9 are synchronously connected to the crankshaft 7 by a belt-pulley mechanism which is not shown in the drawing.

At an inner position in an axial direction of the above described crank pulley, the crankshaft 7 is provided with a crank sprocket 10 and at a further inner axial position, with a drive pinion 11.

The drive pinion 11 synchronously meshes with two driven pinions 12 which are provided at symmetrical positions with respect to a vertical plane bisecting the provided angle between the banks and passing a center of the crankshaft. These two driven pinions 12 are integrally provided with small sprockets 13 respectively. Each of silent chains 15 for driving the camshafts is wound around each of these small sprockets 13 and cam sprockets 14 provided on the two camshafts 5 of each of the cylinder banks as shown in FIG. 1. Thus, the rotation of the crankshaft 7 is transmitted to the two each of the camshafts 5 of both the banks.

The upper block 1 and the lower block 2 are divided at a horizontal plane passing the center of the crankshaft. At vertically symmetrical positions with respect to the dividing plane are pivotally supported two balance shafts 16*a*, 16*b* whose axes extend in parallel to the crankshaft 7.

The balance shaft 16*b*, which is supported at a side of the lower block 2, is fitted a balance shaft sprocket 17. By winding a silent chain 19 around the balance shaft sprocket 17, the crank sprocket 10, and a pump sprocket 18 which is fixed to an oil pump (not shown) attached to a lower face of the lower block 2, the lower balance shaft 16*b* and the oil pump are driven to rotate synchronously with the crankshaft 7.

The two balance shafts 16*a*, 16*b* are adapted to rotate in reverse directions with respect to each other at a same rotation speed by a mesh between gears 20*a*, 20*b* which have the same teeth number and are fitted to axially inner positions of the balance shaft sprocket 17.

Tensioner units 21*a*, 21*b*, 21*c* automatically adjust a driving force by a hydraulic plunger. Tensioner shoes 22*a*, 22*b*, 22*c* apply pressing forces from the tensioner units to the silent chain 19. Tensioner units 21*a*, 21*b*, 21*c*, tensioner shoes 22*a*, 22*b*, 22*c* and vibration preventing chain guides 23*a*, 23*b*, 23*c* are respectively provided on the silent chains 15 which are wound around the camshafts 5 and the cam sprockets 14 of both the cylinder banks and on the silent chain 19 which is wound around the balance shaft sprocket 17 and the pump sprocket 18.

The whole chain-sprocket mechanism is covered with the chain cover which will be described later.

Now, the structures for fitting the tensioner units 21*a*, 21*b* on both the cylinder banks will be described. Because the two tensioner units 21*a*, 21*b* are of the same structure, only the tensioner unit 21*a* of the right hand bank will be described here.

Figure 2:
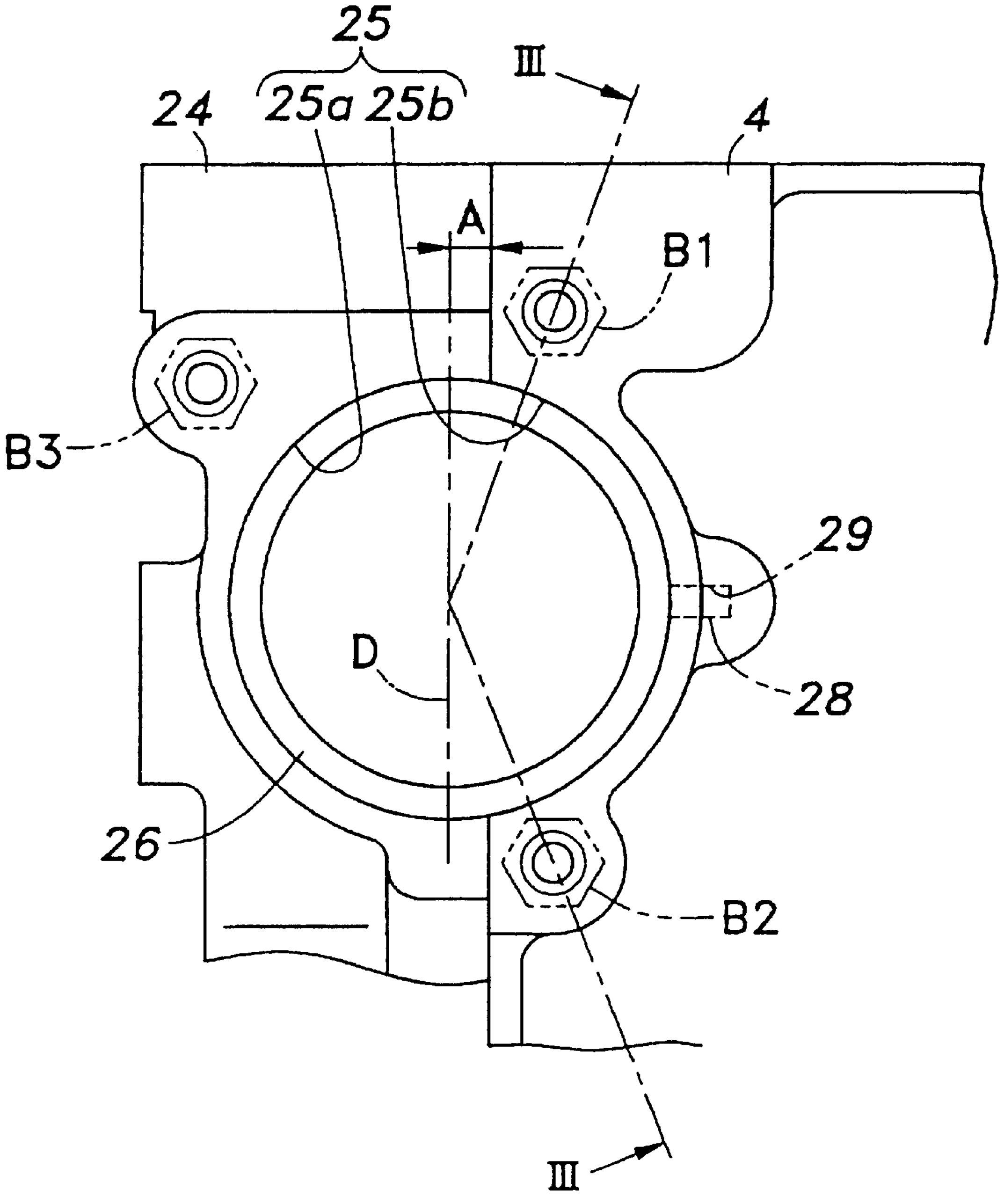
FIG. 2 is an enlarged side view showing an essential part of the invention.
Figure 3:
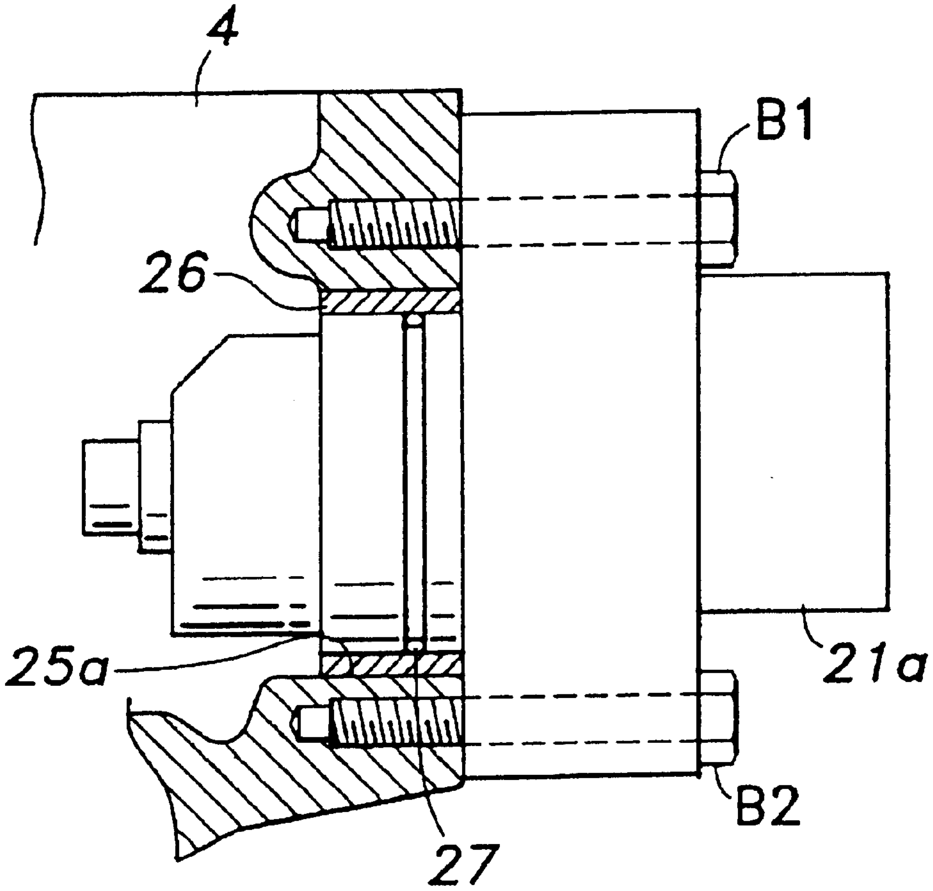
FIG. 3 is a view partly in section taken along a line III—III in FIG. 2.

As shown in FIGS. 2 and 3, the tensioner unit 21*a* is fitted in a tensioner unit fitting hole 25 comprising two cooperating semicircular recesses 25*a*, 25*b*. The tensioner unit fitting hole 25 is formed across mated faces between the cylinder head 4 as a first member and a chain cover 24 as a second member. More particularly, an annular collar 26 is fitted in the fitting hole 25 which serves as a component fitting hole through a liquid gasket (not shown). The tensioner unit 21*a* which is the component to be fitted is adapted to be fitted to an inner peripheral face of this collar 26 through an O-ring 27. FIG. 2 is shown in a state where the tensioner unit 21*a* is removed.

Even though accuracy of perfect roundness of the fitting hole 25 has been lost due to an error in assembling the chain cover 24 to the cylinder head 4, this arrangement will completely eliminate such fears that the O-ring may be broken and a sealing property may be lost, because the O-ring 27 is abutted against the inner peripheral face of the collar 26.

Steps of fitting the tensioner unit 21*a* start with fitting of the collar 26 to the semicircular recess 25*b* at the side of the cylinder head 4 prior to fitting the chain cover 24. On this occasion, the liquid gasket is first applied to an inner peripheral face of the recess 25*b* or an outer peripheral face of the collar 26. Then, a locating pin 28 projectingly formed at a position of the outer peripheral face of the collar 26 is fitted in a corresponding hole 29 in a bottom face of the recess 25*b*. Next, the tensioner unit 21*a* is inserted into the collar 26 and fixed by two fitting bolts B1, B2 screwed into the cylinder head 4. By thus providing the two fitting bolts at the side of the cylinder head 4, an adequate fitting rigidity can be obtained in a state before mounting the chain cover 24. Therefore, the connected part between the tensioner unit 21*a* and the tensioner shoe 22*a* can be easily observed visually, and at the same time, the assembling workability of the connected part can be improved.

Integrally forming the locating pin 28 with the collar 26 will contribute to reduction of number of the components.

Finally, the chain cover 24 is fitted to an inner peripheral face of the semicircular recess 25*a* at the side of the chain cover 24 or the outer peripheral face of the collar 26 after applying the liquid gasket thereto. Then, a fitting bolt B3 of the tensioner unit 21*a* is screwed into the chain cover 24.

By thus interposing the collar 26 in the fitting hole 25 formed at the mated faces between the cylinder head 4 and the chain cover 24, the tensioner unit 21*a* can be liquid-tightly assembled to the mated faces between the cylinder head 4 and the chain cover 24 while being independent from an assembling accuracy of the chain cover 24 relative to the cylinder head 4.

In this embodiment, the mated faces between the cylinder head 4 and the chain cover 24 are slightly displaced toward the cylinder head 4 from a plane passing a center of the tensioner unit 21*a* by a length A as shown in FIG. 2. For this reason, the inner peripheral face of the semicircular recess 25*a* at the side of the chain cover 24 is tangentially extended from a diametrical line D which is parallel to the mated faces, and the chain cover 24 can be fitted without problem after the collar 26 has been fitted to the cylinder head 4 in advance. This arrangement can make a dimension of the cylinder head 4 in an axial direction of the crankshaft as small as possible and contributes to a light weight of the engine as a whole.

The perfect roundness of the fitting hole 25 may be lost in the above described structure, but a gap created to such an extent will not present an obstacle to secure the liquid tightness by the liquid gasket.

Moreover, because the chain tensioner unit 21*a* is fitted to the cylinder head 4 by the collar 26, it can be fixed and detached without removing the chain cover 24, and the upkeeping and maintainability will be improved. Particularly, because the locating pin 28 serves to locate the collar 26, workability of fitting and removing the tensioner unit 21*a* will be enhanced.

Figure 4:
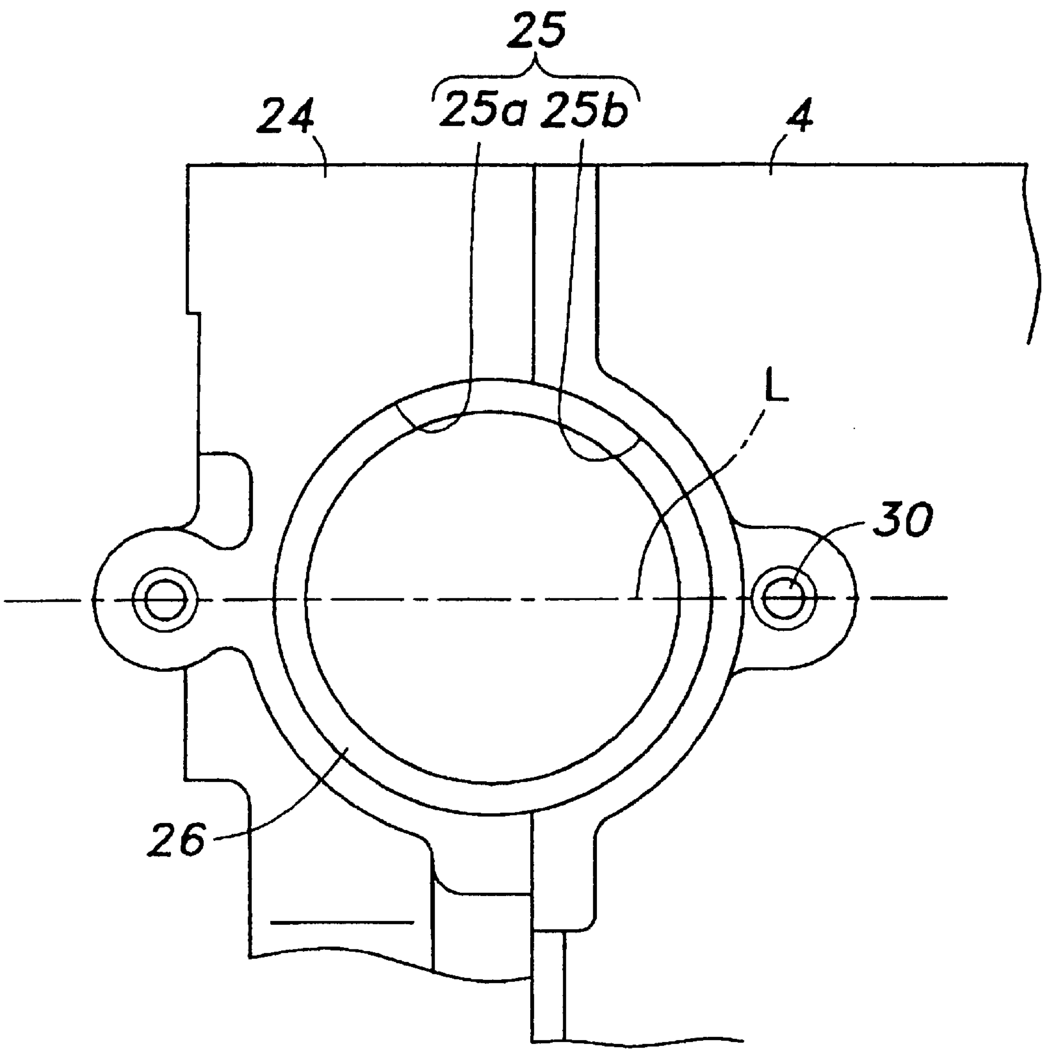
FIG. 4 is an enlarged side view showing a modified embodiment of the invention.

In case where the bolting holes 30 are formed in the cylinder head 4 along a straight line L which is perpendicular to the mated faces between the cylinder head 4 and the chain cover 24 and passes the center of the chain tensioner unit 21*a* as shown in FIG. 4, the tensioner unit 21*a* will be prevented from rotating to come out of the recess 25*b* in the cylinder head 4, even though the tensioner unit 21*a* is temporarily fastened to the cylinder head 4 with a single bolt. Accordingly, the working steps of fitting the tensioner unit 21*a* to an exterior of a bank of the V-type engine which provides a downwardly facing diagonal face will be reduced in number.

Figure 5:
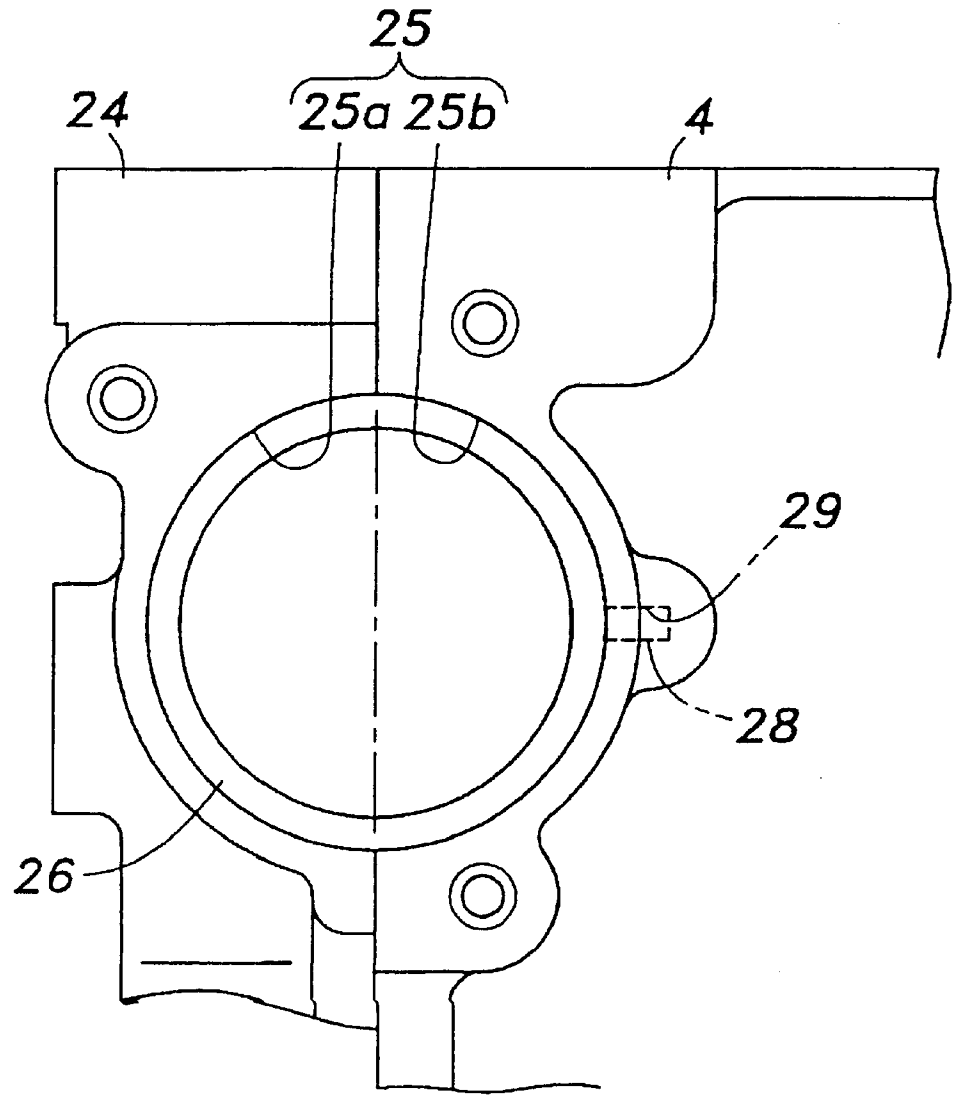
FIG. 5 is an enlarged side view showing another modified embodiment of the invention.

Further, in case where the mated faces between the cylinder head 4 and the chain cover 24 are in alignment with the center of the tensioner unit 21*a* as shown in FIG. 5, both the recess 25*a* in the chain cover 24 and the recess 25*b* in the cylinder head 4 present perfect semicircles respectively. In this case, as the gap between the inner peripheral face of the fitting hole 25 and the outer peripheral face of the collar 26 will be constant along the entire circumference, the sealing property can be further enhanced.

In either of the embodiments as shown in FIGS. 2, 4 and 5, the fixing part of the tensioner unit 21*a* is provided also at the side of the head cylinder 4 which has high rigidity, and therefore, an enhanced fitting rigidity can be obtained.

Figure 6:
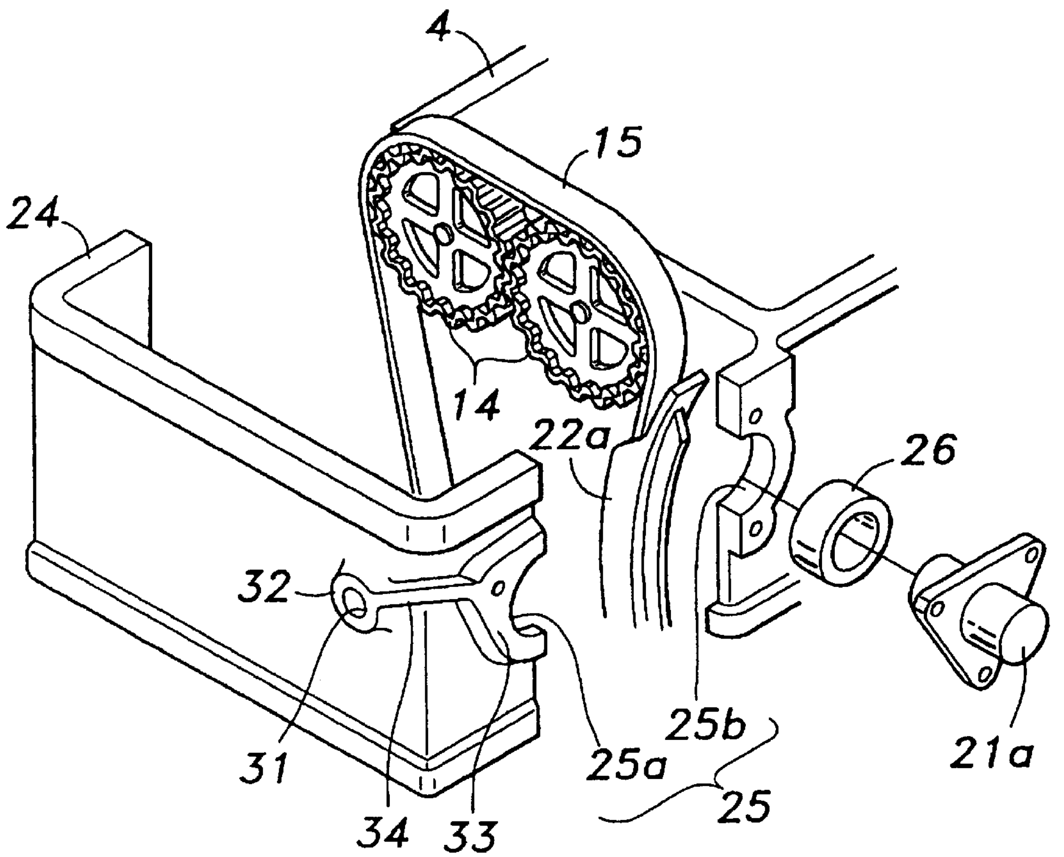
FIG. 6 is an exploded perspective view of an essential part showing an area around an access hole for removing a lock pin.

The chain cover 24 may be provided with an access hole 31 (usually closed with a plug) in order to remove a lock pin for retaining the plunger of the tensioner unit 21*a* so as not to operate during transportation as shown in FIG. 6, and a boss 32 including the access hole 31 and a boss 33 around the fitting hole 25 may be connected by a rib 34. In this case, the access hole 31 and the fitting hole 25 can be connected by a short rib because they are positioned close to each other, and accordingly, the rigidity around this area can be enhanced while restraining an increase in weight to the least extent.

It is to be noted that the invention is not limited to the application to such the chain tensioner unit as described above, but may be applied, for example, to a fitting hole for a sensor which detects a rotation angle of a camshaft or a crankshaft, and an inspection hole which is provided in order to confirm a phase of a balance shaft and usually closed with a plug. Further, the invention is not necessarily applied to an engine, but similarly applied to any case wherein a component is fitted in a hole which is formed across mated faces of two members.

Note that although in the embodiment above the fitting structure among the cylinder head 4, the chain cover 24 and the tensioner unit 21*a* are explained, the present invention may be applied to a fitting structure among a cylinder block, a belt cover attached to the cylinder block and a tensioner unit for a belt. At this time, the chain 15 may be replaced with the belt, and the chain cover 24 may be replaced with the belt cover.

According to the invention, the component such as the tensioner unit can be fitted in such a manner as interposed between the two members, for example, at the mated faces between the cylinder head or the cylinder block and the chain cover or the belt cover. Therefore, remarkable effects can be obtained in improving the fitting workability and the maintainability without damaging the sealing property and incurring upsizing.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A component fitting structure which comprises:

a first member and a second member mated with said first member which define a component fitting hole which is formed across mated faces therebetween;

a collar fitted in said component fitting hole through a liquid gasket; and a component fittingly engaged with said collar, wherein;

said first member comprises at least one of a cylinder head and a cylinder block, said second member comprises at least one of a chain cover and a belt cover, and said component comprises a tensioner unit.

2. A component fitting structure as claimed in claim 1, wherein said component fitting hole comprises a semicircular recess formed in said first member and a semicircular recess formed in said second member.

3. A component fitting structure as claimed in claim 1, wherein said component is fittingly engaged with an inner peripheral face of said collar through an O-ring.

4. A component fitting structure as claimed in claim 2, wherein said collar is provided with a locating pin at a position of an outer peripheral face thereof, said locating pin being fitted in a corresponding hole formed in a bottom face of said semicircular recess formed in said first member.

5. A component fitting structure as claimed in claim 4, wherein said locating pin is integrally formed with said collar.

6. A component fitting structure as claimed in claim 1, wherein said mated faces are displaced from a plane passing a center of said component toward either of said first member and said second member.

7. A component fitting structure as claimed in claim 1, wherein said mated faces are in alignment with said center of said component to be fitted.

8. A component fitting structure as claimed in claim 2, wherein said collar is provided with a locating pin at a position of an outer peripheral face thereof, and said locating pin is fitted in a corresponding hole formed in a bottom face of said recess of said fitting hole.

9. A component fitting structure as claimed in claim 8, wherein said locating pin is integrally formed with said collar.

10. A component fitting structure as claimed in claim 1, wherein said mated faces are slightly displaced from a plane passing said center of said tensioner unit toward one of said cylinder head and said cylinder block.

11. A component fitting structure as claimed in claim 10, wherein said component fitting hole comprises a semicircular recess formed in said one of cylinder head and said cylinder block and a semicircular recess formed in said one of said chain cover and said belt cover, and an inner peripheral face of said semicircular recess at side of said one of said cylinder head and said cylinder block is tangentially extended from a straight line which is parallel to said mated faces.

12. A component fitting structure as claimed in claim 1, wherein fitting bolts of said tensioner unit are fastened at two points in one of said cylinder head and said cylinder block.

13. A component fitting structure as claimed in claim 1, wherein one of said cylinder head and said cylinder block is provided with at least one bolting hole along a straight line which is perpendicular to said mated faces and passes said center of said tensioner unit.

14. A component fitting structure as claimed in claim 1, wherein one of said chain cover and belt cover is provided with an access hole in order to remove a lock pin for locking an operation of a plunger of said tensioner unit, a first boss including said access hole, and a second boss around said fitting hole are connected by a rib.

15. A component fitting structure as claimed in claim 13, wherein said one of said cylinder head and said cylinder block is provided with a single bolting hole along the straight line, and said tensioner unit is fitted to an exterior of a bank of a V-type engine.

16. A component fitting structure which comprises:

a first member and a second member mated with said first member which define a component fitting hole which is formed across mated faces therebetween;

a collar fitted in said component fitting hole through a liquid gasket; and a component fittingly engaged with said collar, wherein said component fitting hole comprises a semicircular recess formed in said first member and a semicircular recess formed in said second member, and said component is fittingly engaged with an inner peripheral face of said collar through an O-ring.

17. A component fitting structure which comprises:

a first member and a second member mated with said first member which define a component fitting hole which is formed across mated faces therebetween;

a collar fitted in said component fitting hole through a liquid gasket; and a component fittingly engaged with said collar, wherein; said collar is provided with a locating pin at a position of an outer peripheral face thereof, said locating pin being fitted in a corresponding hole formed in said first member.

18. A component fitting structure as claimed in claim 17, wherein said locating pin is integrally formed with said collar.

19. A component fitting structure which comprises:

a first member and a second member mated with said first member which define a component fitting hole which is formed across mated faces therebetween;

a collar fitted in said component fitting hole through a liquid gasket; and a component fittingly engaged with said collar, wherein; said mated faces are displaced from a plane passing a center of said component toward either of said first member and said second member.

* * * * *